(12) United States Patent
Furuta (10) Patent No.: US 7,846,527 B2
(45) Date of Patent: Dec. 7, 2010

(54) HONEYCOMB FILTER

(75) Inventor: Yasuyuki Furuta, Kounan (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/537,858

(22) Filed: Aug. 7, 2009

(65) Prior Publication Data

US 2009/0297766 A1    Dec. 3, 2009

Related U.S. Application Data

(63) Continuation of application No. PCT/JP2008/051072, filed on Jan. 25, 2008.

(30) Foreign Application Priority Data

Mar. 28, 2007    (JP) .............................. 2007-083318

(51) Int. Cl.
*B32B 3/12* (2006.01)
*B01D 39/06* (2006.01)
(52) U.S. Cl. .......................... 428/116; 55/523
(58) Field of Classification Search ................. None
See application file for complete search history.

(56) References Cited

U.S. PATENT DOCUMENTS

| | | | |
|---|---|---|---|
| 4,416,676 A * | 11/1983 | Montierth | ................... 55/523 |
| 4,417,908 A | 11/1983 | Pitcher, Jr. | |
| 2005/0011174 A1 | 1/2005 | Hong et al. | |
| 2005/0016140 A1 | 1/2005 | Komori et al. | |
| 2005/0016141 A1 * | 1/2005 | Hong et al. | ................... 55/523 |
| 2005/0076627 A1 | 4/2005 | Itou et al. | |
| 2005/0191461 A1 | 9/2005 | Kasai et al. | |
| 2006/0019061 A1 | 1/2006 | Oshimi | |
| 2006/0188415 A1 | 8/2006 | Ohno et al. | |
| 2006/0194018 A1 | 8/2006 | Ohno et al. | |

FOREIGN PATENT DOCUMENTS

| | | | |
|---|---|---|---|
| FR | 2 789 327 A1 | | 8/2000 |
| FR | 2789327 | * | 8/2000 |
| JP | A-2001-334114 | | 12/2001 |
| JP | A-2005-125209 | | 5/2005 |
| JP | A-2005-270969 | | 10/2005 |
| WO | WO 03/080218 A1 | | 10/2003 |
| WO | WO 2004/024293 A1 | | 3/2004 |
| WO | WO 2005/079165 A2 | | 9/2005 |

* cited by examiner

*Primary Examiner*—Gordon R Baldwin
(74) *Attorney, Agent, or Firm*—Oliff & Berridge, PLC (57) ABSTRACT

A honeycomb segment has two kinds of cells having different cross-sectional areas in a cross-section cut along a plane perpendicular to the longitudinal direction of the segment. When the cells are cut along a plane perpendicular to the longitudinal direction of the cells, each cross-sectional area of first cells (large cells) is larger than that of second cells (small cells). The first cells are formed into an octagon where corners are cut off or into a square having circular arc corners. The second cells are formed into a square. The thickness of a 1-1 wall between the adjacent first cells is larger than that of a 1-2 wall between each first cell and each second cell adjacent to the first cell.

8 Claims, 6 Drawing Sheets

HONEYCOMB FILTER

TECHNICAL FIELD

The present invention relates to a honeycomb filter. More particularly, it relates to a honeycomb filter capable of preventing the end surface of the filter on the inflow side of a fluid from being clogged with particulates and keeping a high strength.

BACKGROUND ART

There is an increasing need to remove particulates and harmful substances from an exhaust gas discharged from an internal combustion engine, a boiler or the like in consideration of influences on the environment. In particular, regulations on the removal of a particulate material (hereinafter referred to as "PM" sometimes) discharged from a diesel engine tend to be strengthened worldwide. The use of a honeycomb filter as a diesel particulate filter (hereinafter referred to as "DPF" sometimes) for collecting and removing the PM receives attention, and various systems are suggested. The above DPF has a structure in which a plurality of cells as fluid through channels having a square cross-sectional shape are usually defined by porous partition walls, and the cells are alternately plugged, whereby the porous partition walls defining the cells perform a filter function. Here, the cross-sectional shape is the shape of each cross section of the cells cut along a plane perpendicular to the longitudinal direction of the cells.

In the DPF, the exhaust gas or the like containing the particulates is caused to flow into the filter from the side of one end of the filter, and the particulates are filtered by the partition walls. Afterward, the purified gas is discharged from the side of the other end of the filter. However, there is a problem that when the exhaust gas flows into the filter, the particulates contained in the exhaust gas are deposited on the one end (the end of the side into which the exhaust gas flows) of the filter to clog the cells. This is a phenomenon easily caused in a case where the exhaust gas contains a large amount of particulates or in a cold district. When the cells are clogged in this manner, there is a problem that the pressure loss in the DPF rapidly increases. To suppress such cell clogging, it is suggested that each cross-sectional area of open cells (inflow-side cells) in the end of the filter on the exhaust gas inflow side should be different from that of open cells (outflow-side cells) in the other end of the filter (in the end on the exhaust gas outflow side). Here, the cross-sectional areas are the areas of the cross sections of the cells cut along the plane perpendicular to the longitudinal direction of the cells.

In the honeycomb filter having the square cross-sectional shapes of the cells, however, when each cross-sectional area of the inflow-side cells is different from that of the outflow-side cells, the thicknesses of the partition walls defining the cells disadvantageously become small to decrease the strength of the filter at a part of sections (hereinafter referred to as "the intersections" sometimes) where the partition walls intersect with one another. Therefore, when the PM is deposited on the DPF, post injection is performed to burn and remove the PM. However, in this case, there is a problem that a stress is concentrated on the thinned part of the intersections, and the filter easily breaks down. Here, the section where the partition walls intersect with each other is a portion belonging to both the intersecting partition walls in the cross section of the honeycomb filter cut along a plane perpendicular to the longitudinal direction of the filter. Examples of the portion include a square region of an intersecting portion of the above cross section in a case where the linearly extending partition walls having an equal thickness intersect with each other.

Moreover, a honeycomb filter including inflow-side cells having large cross-sectional areas and outflow-side cells having small cross-sectional areas is suggested, in which the cells having large cross-sectional areas have an octagonal cross-sectional shape obtained by linearly cutting off the corners of a square shape (e.g., see Patent Document 1).

When the cells have the octagonal cross-sectional shape, the problem that a part of the above intersections becomes thin can slightly be solved, but the problem of the decreased strength remains. Therefore, there is a demand for a honeycomb filter which solves the problem of the clogged cells and the problem of the decreased strength.

Patent Document 1: FR-2789327-A

DISCLOSURE OF THE INVENTION

An object of the present invention is to provide a honeycomb filter which improves a fluid flow among partition walls to heighten a collecting performance and which increases the strength the filter.

To achieve the above object, according to the present invention, the following honeycomb filter is provided.

[1] A honeycomb filter including porous partition walls which define a plurality of cells as through channels of a fluid, first cells opened in one end of the filter and plugged in the other end thereof and second cells plugged in the one end and opened in the other end being alternately arranged, the fluid flowing into the one end of the filter where the first cells open being passed through the partition walls and being discharged as the passed fluid into the second cells, the passed fluid being discharged from the other end of the filter where the second cells open, wherein each cross-sectional area of the first cells is larger than that of the second cells in a cross section cut along a plane perpendicular to the longitudinal direction of the cells, the first cells and the second cells are alternately arranged in a first direction and a second direction perpendicular to the first direction in the cross section cut along the plane perpendicular to the longitudinal direction of the cells, and the thickness of a 1-1 wall between the adjacent first cells is larger than that of a 1-2 wall between each first cell and the second cell adjacent to the first cell.

[2] The honeycomb filter according to the above [1], wherein the first cells are formed into an octagon where corners are cut off or into a square having circular arc corners, and the second cells are formed into a square.

[3] The honeycomb filter according to the above [1] or [2], wherein the thicknesses of the walls between the cells and the widths of the cells satisfy the following formula (1):

$$Rib_{1-1} \geq \frac{\sqrt{2}}{2}l - \frac{1}{2}W_1 + \frac{1}{2}W_2 = Rib_{1-2}, \quad (1)$$

in which $Rib_{1-1}$: the thickness of the 1-1 wall between the adjacent first cells;

$Rib_{1-2}$: the thickness of the 1-2 wall between the first cell and the second cell adjacent to the first cell;

$W_1$: the width of the first cell;

$W_2$: the width of the second cell; and l: the thickness of the wall between the adjacent second cells.

The honeycomb filter according to the above [3], wherein the thicknesses of the walls between the cells satisfy the following formula (2):

$$1 < Rib_{1-1}/Rib_{1-2} < 1.175 \qquad (2).$$

[5] The honeycomb filter according to any one of the above [1] to [4], wherein a plurality of honeycomb segments including the first cells and the second cells being arranged in parallel with one another in the longitudinal direction are joined via joining material layers.

Since the thickness of the wall between the first cells is larger than that of the wall between the first cell and the second cell, the fluid can easily flow from the first cells to the second cells. Moreover, the flow rate of the fluid is increased while decreasing a pressure loss due to deposited soot, that is, the strength of the honeycomb filter can be increased while improving a collecting performance.

DESCRIPTION OF REFERENCE NUMERALS

1: honeycomb filter, 2: honeycomb segment, 4: outer peripheral coat layer, 5: cell, 5a: first cell (large cell), 5b: second cell (small cell), 6: partition wall, 7: filling material, and 9: joining material layer.

BEST MODE FOR CARRYING OUT THE INVENTION

Hereinafter, an embodiment of the present invention will be described with reference to the drawings. The present invention is not limited to the following embodiment, and can be altered, modified or improved without departing from the scope of the present invention.

Figure 1:
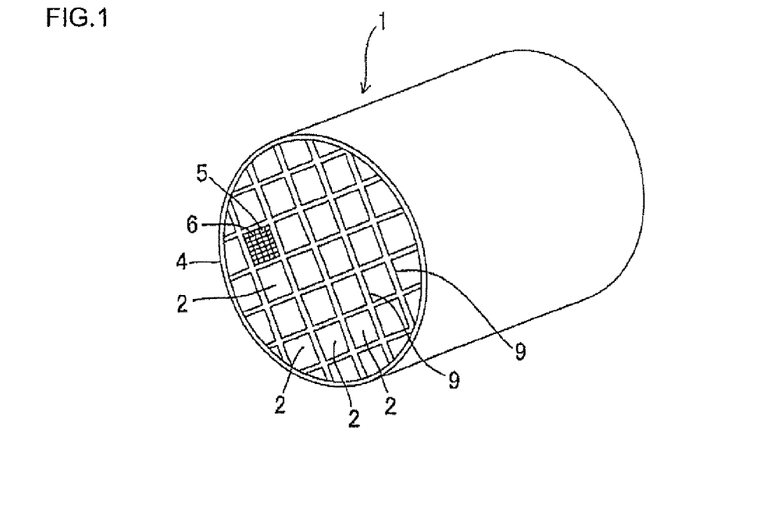
FIG. 1 is a perspective view schematically showing one embodiment (the whole shape of a cross section cut along a plane perpendicular to a central axis is a circle) of a honeycomb filter of the present invention.
Figure 2:
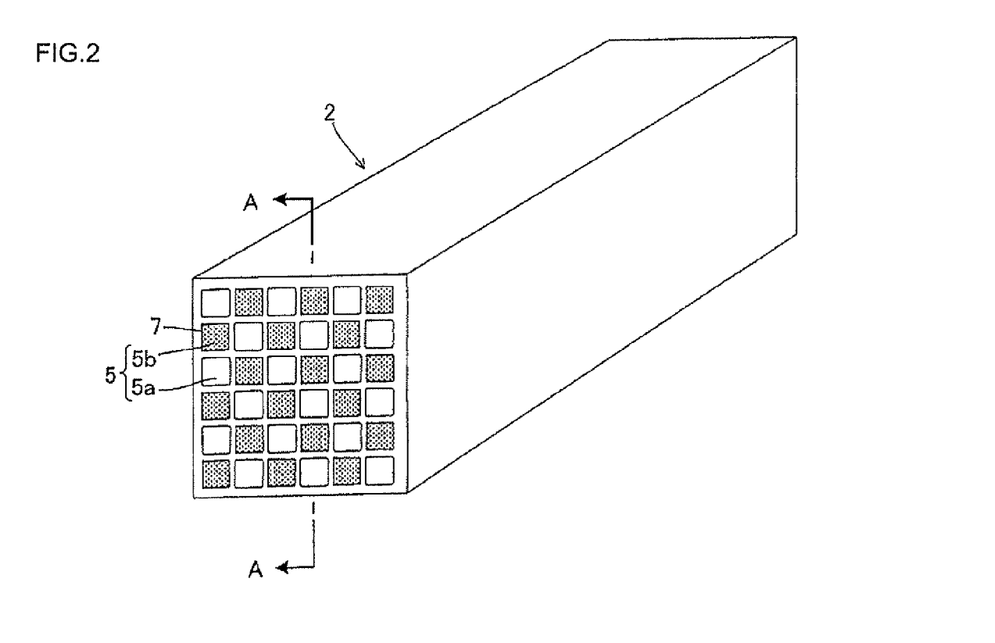
FIG. 2 is a perspective view schematically showing honeycomb segments used in another embodiment of the honeycomb filter of the present invention.
Figure 3:
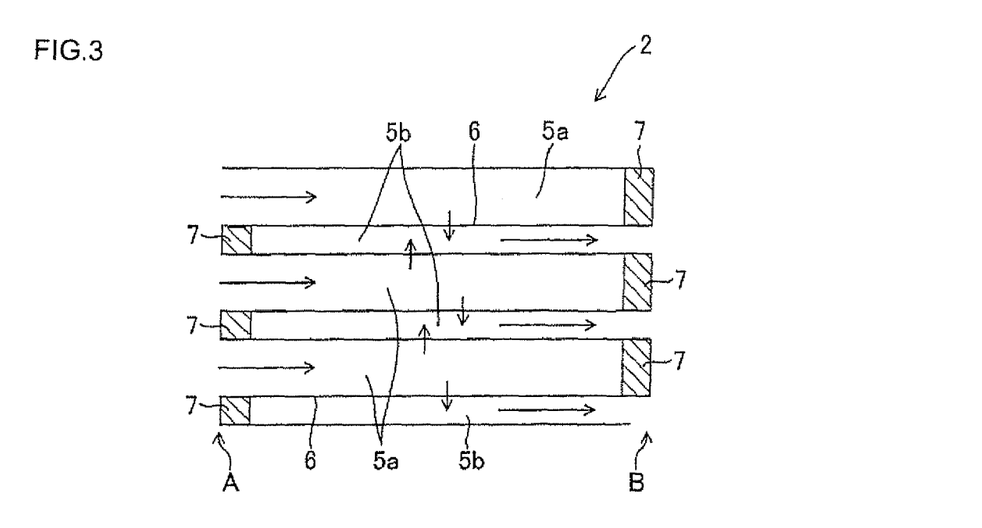
FIG. 3 is a cross-sectional view cut along the A-A line of FIG. 2.

FIG. 1 is a perspective view schematically showing a honeycomb filter of the present invention. FIG. 2 is a perspective view schematically showing honeycomb segments constituting the honeycomb filter of FIG. 1. Furthermore, FIG. 3 is a cross-sectional view of the honeycomb segment cut along the A-A line of FIG. 2.

Here, as shown in FIGS. 1 and 2, a honeycomb segment 2 of the present invention has a shape of a part of the whole structure of a honeycomb filter 1 (a joined honeycomb segment article), and the honeycomb segments are assembled in a direction perpendicular to the central axis (the longitudinal direction) of the honeycomb filter 1 to constitute the honeycomb filter 1. Cells 5 are arranged in parallel with one another in the central axis direction of the honeycomb filter 1, and the ends of the adjacent cells 5 are alternately plugged with a filling material 7.

Furthermore, the embodiment will specifically be described. The honeycomb segment 2 is formed into a columnar shape having a square cross section, includes a porous partition walls 6 which define the plurality of cells 5 as through channels of a fluid, and is provided with two kinds of cells 5a and 5b having different cross-sectional areas in a cross section cut along a plane perpendicular to the longitudinal direction of the cells 5. When the cells are cut along a plane perpendicular to the longitudinal direction of the cells, each cross-sectional area of the first cells (large cells) 5a is larger than that of the second cells (small cells) 5b. The first cells are formed into an octagon where corners are cut off or into a square having circular arc corners, and the second cells 5b are formed into a square. Moreover, the corners include a vertex of a polygonal cross-sectional shape (a polygon formed of an extended linear portion) and portions around the vertex.

The first cells 5a and the second cells 5b are alternately arranged in a first direction and a second direction perpendicular to the first direction in the plane cut along the plane perpendicular to the longitudinal direction of the cells, and the thickness of a 1-1 wall between the first cell 5a and the first cell 5a adjacent to the first cell 5a is larger than that of a 1-2 wall between the first cell 5a and the second cell 5b adjacent to the first cell 5a. Moreover, as schematically shown in a cross-sectional view of FIG. 3, the first cells 5a opened in one end A of the segment and plugged in the other end B thereof and the second cells 5b plugged in the one end A and opened in the other end B are alternately arranged. The fluid flows into the one end A where the first cells 5a open, is passed through the partition walls 6 and is discharged as the passed fluid into the second cells 5b, and the passed fluid can be discharged from the other end B where the second cells 5b open.

Thus, according to the honeycomb filter 1 of the present embodiment, each cross-sectional area of the first cells 5a is different from that of the second cells 5b (each cross-sectional area of the first cells 5a is larger than that of the second cells 5b). When the fluid is caused to flow into the end (the one end) A on the open side of the first cells 5a (the first cells 5a having large cross-sectional areas are inflow-side cells) and an exhaust gas containing particulates is caused to flow through the honeycomb filter 1, the first cells 5a opened in the one end (the inflow-side end) A can be prevented from being clogged. Moreover, the cross-sectional shape of the first cells 5a having large cross-sectional areas is an octagon where four corners are cut off or a square having circular arc corners, and the thickness of the 1-1 wall between the cells is larger than that of the 1-2 wall between the cells, whereby it is possible to prevent a part of a section (an intersection) where the partition walls intersect with each other from being thinned, and to keep a high strength.

Figure 4:
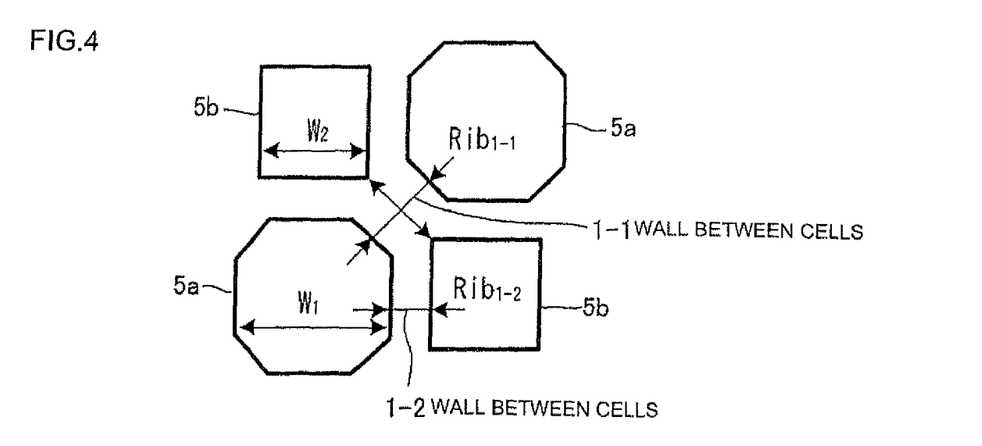
FIG. 4 is an explanatory view for explaining a positional relation between cells.

Positional relations between the first cells (the large cells) 5a and the second cells (the small cells) 5b will be described with reference to FIG. 4. In the honeycomb segment 2, the plurality of first cells 5a and second cells 5b as the through channels of the fluid are arranged in parallel with one another in the longitudinal direction (the axial direction), and the thicknesses of the walls between the cells 5 and the widths of the cells satisfy the following formula (1):

$$Rib_{1-1} \geq \frac{\sqrt{2}}{2}l - \frac{1}{2}W_1 + \frac{1}{2}W_2 = Rib_{1-2}, \quad (1)$$

in which $Rib_{1-1}$: the thickness of the 1-1 wall between the adjacent first cells;

$Rib_{1-2}$: the thickness of the 1-2 wall between the first cell and the second cell adjacent to the first cell;

$W_1$: the width of the first cell;

$W_2$: the width of the second cell; and l: the thickness of the wall between the adjacent second cells.

Furthermore, the thicknesses of the walls between the cells 5 satisfy the following formula (2):

$$1 < Rib_{1-1}/Rib_{1-2} < 1.175 \quad (2),$$

in which $Rib_{1-1}/Rib_{1-2}$ is preferably 1.05 to 1.15, further preferably 1.07 to 1.13.

Figure 5A:
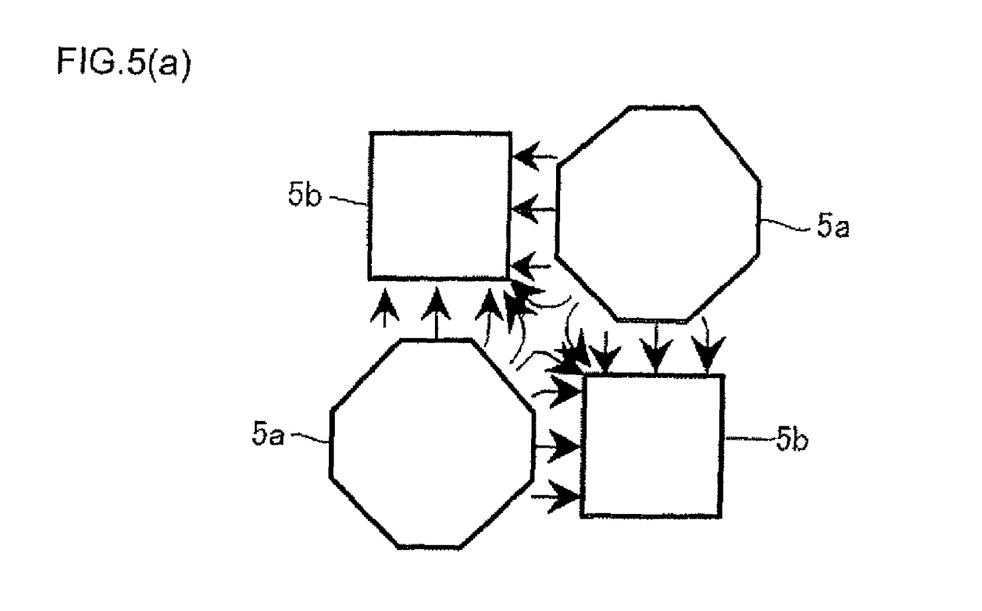
FIG. 5(a) is an explanatory view for explaining a fluid flow in the honeycomb filter of the present invention.
Figure 5B:
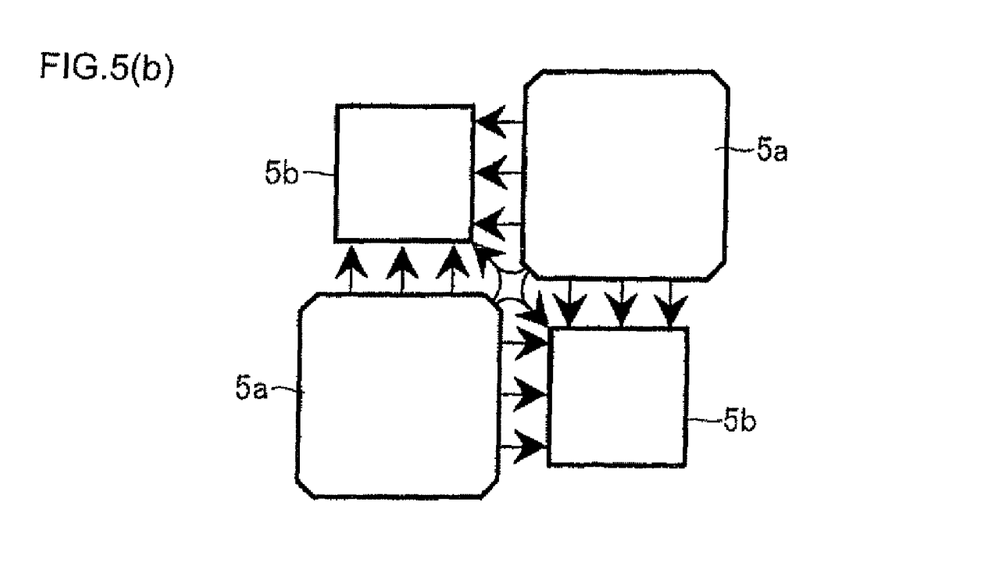
FIG. 5(b) is an explanatory view for explaining a fluid flow in a conventional honeycomb filter.

According to the above constitution, as shown in FIG. 5(a), the wall between the first cells (the large cells) is thicker than the wall between the first cell and the second cell (the large cell and the small cell), whereby an air current easily flows from the large cells to the small cells. When the wall between the large cells is thin, the through channels of the air current cannot be secured, and hence the filter effect of wall surfaces cannot completely be utilized. However, when the wall thicknesses are increased to secure the through channels, all the wall surfaces of the inlet cells can equally be utilized as a filter. Therefore, a valid filter area increases, and a collecting performance improves. Moreover, the walls of the corners of the large cells which have a low strength and which are easily distorted can be thickened to increase the strength. That is, the valid filter area can be increased, and a pressure loss due to deposited soot can be decreased. On the other hand, as shown in FIG. 5(b), when the thickness of the wall between the large cells is equal to that of the wall between the large cell and the small cell as in a conventional example, it is difficult to secure the through channels of the fluid. In a case where the honeycomb filter has a constitution which satisfies the formula (2), the flow rate of the fluid is increased while decreasing the pressure loss due to the deposited soot. That is, the strength of the honeycomb filter can be increased while improving the collecting performance.

As a material of the honeycomb segment 2, from the viewpoints of the strength and a thermal resistance, it is preferable to use at least one selected from the group consisting of silicon carbide, a silicon-silicon carbide based composite material, silicon nitride, cordierite, mullite, alumina, spinel, a silicon carbide-cordierite based composite material, a silicon-silicon carbide composite material, lithium aluminum silicate, aluminum titanate and an Fe—Cr—Al based metal. Above all, silicon carbide or the silicon-silicon carbide based composite material is preferably used.

To prepare the honeycomb segment 2, for example, a binder such as methyl cellulose, hydroxypropoxyl cellulose, hydroxyethyl cellulose, carboxymethyl cellulose or polyvinyl alcohol, a surfactant, water as a solvent and the like can be added to a material appropriately selected from the above materials to obtain a kneaded clay having plasticity, and this clay is extruded into the above shape, followed by drying with microwaves, hot air or the like and then sintering.

As the filling material 7 used for plugging the cells 5, a material similar to that of the honeycomb segment 2 may be used. The plugging with the filling material 7 can be performed by immersing the end surface of the honeycomb segment 2 into the slurried filling material 7 to charge the material into the open cells 5, while the cells 5 which are not to be plugged are masked. The filling material 7 may be charged before or after firing, after the honeycomb segment 2 is formed, but the material is preferably charged before the firing, because a firing step is completed once.

After preparing the honeycomb segment 2 as described above, the slurried joining material layer 9 is applied onto the outer peripheral surface of the honeycomb segment 2, and a plurality of honeycomb segments 2 are assembled to obtain a predetermined three-dimensional shape (the whole structure of the honeycomb filter 1). The assembled segments are pressed, heated and dried. Thus, a joined article is prepared in which the plurality of honeycomb segments 2 are integrally joined.

As shown in, for example, FIG. 1, the honeycomb filter 1 obtained in the present invention includes a joined honeycomb segment article in which a plurality of honeycomb segments 2 are integrally joined at mutual joining faces via the joining material layers, and an outer peripheral coat layer 4 which coats the outer peripheral surface of the joined honeycomb segment article, and the filter has a structure in which a plurality of cells 5 as the through channels of the fluid are arranged in parallel with one another in the central axis direction of the filter.

It is to be noted that the joining material layers 9 used in the present invention are applied onto the outer peripheral surfaces of the honeycomb segments 2, and function so as to join the honeycomb segments 2. To prepare the joining material layer 9, for example, after preparing the honeycomb segment 2, the slurried joining material layer 9 is applied onto the outer peripheral surface of the honeycomb segment 2. The plurality of honeycomb segments 2 are assembled to obtain a predetermined three-dimensional shape (the whole structure of the honeycomb structure 1), and the assembled honeycomb segments are pressed, heated and dried. In this case, the layers may be applied onto the outer peripheral surfaces of the adjacent honeycomb segments 2, but the layer may be applied onto the corresponding outer peripheral surface of only one of the adjacent honeycomb segments 2.

Preferable examples of the joining material layer 9 used in the present invention include layers made of an inorganic fiber, an inorganic binder, an organic binder and inorganic particles. Specifically, examples of the inorganic fiber include oxide fibers made of aluminosilicate and alumina and another fiber (e.g., an SiC fiber). Examples of the inorganic binder include silica sol, alumina sol and clay. Examples of the organic binder include polyvinyl alcohol (PVA), carboxymethyl cellulose (CMC) and methyl cellulose (MC). Examples of the inorganic particles include particles made of ceramic materials such as silicon carbide, silicon nitride, cordierite, alumina and mullite.

The outer peripheral coat layer 4 is applied onto the outer peripheral surface of the joined article of the honeycomb segments 2, and functions so as to protect the outer peripheral surface of the joined article of the honeycomb segments 2. The thickness of the outer peripheral coat layer 4 is appropriately selected from a range of, for example, 0.1 to 1.5 mm.

In the honeycomb filter 1 obtained as described above, as shown in FIG. 3, the first cells (the inflow cells) 5a are opened on the left end side of the filter, and plugged with the filling material 7 on the right end side thereof. The other cells (the outflow cells) 5b adjacent to these first cells are plugged with the filling material 7 on the left end side of the filter, but opened on the right end side thereof. By such plugging, as shown in FIG. 2, the end surface of the honeycomb segment 2 has a checkered pattern. In a case where the honeycomb filter 1 in which the plurality of honeycomb segments 2 are joined in this manner is disposed in an exhaust system of an exhaust gas, the exhaust gas flows into the cells 5 of each honeycomb segment 2 from the left side of the segment shown in FIG. 3, and moves to the right side thereof. Then, when the exhaust gas passes through the partition walls 6, a particulate material (particulates) including soot in the gas is collected by the partition walls 6. Thus, the exhaust gas can be purified. By such capturing, in the honeycomb segment 2, the particulate material (the particulates) including the soot is deposited with an elapse of time, thereby increasing a pressure loss, and hence the segment is regenerated by burning the soot and the like.

It is to be noted that it has been described in the above embodiment that the first cell 5a is formed into the octagon where the corners are cut off, but the first cell may be formed into a square having circular arc corners. Moreover, it has been described that the honeycomb segments 2 are provided with the first cells 5a and the second cells 5b and that the honeycomb segments 2 are joined to form the honeycomb filter 1, but an integrally formed honeycomb filter may be provided with the first cells 5a and the second cells 5b.

EXAMPLES

Hereinafter, the present invention will be described in more detail with respect to examples, but the present invention is not limited to these examples.

Samples having different thicknesses of walls between first cells, that is, large cells were prepared, and an initial pressure loss, a pressure loss due to deposited soot and a collecting efficiency were evaluated. Hereinafter, the evaluation will be described in detail.

Figure 6:
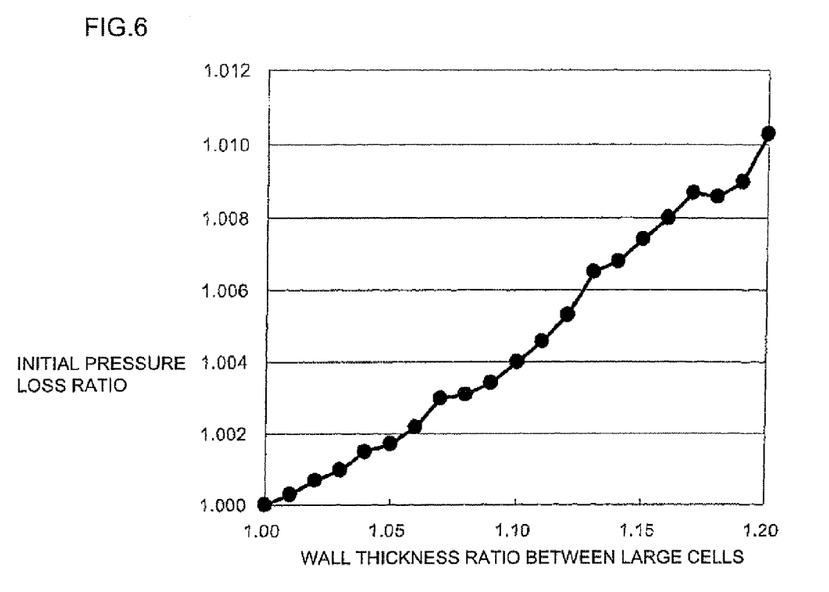
FIG. 6 is a diagram showing an initial pressure loss ratio by the ratio of the thickness of a wall between large cells with respect to that of a wall between the large cell and a small cell.
Figure 7:
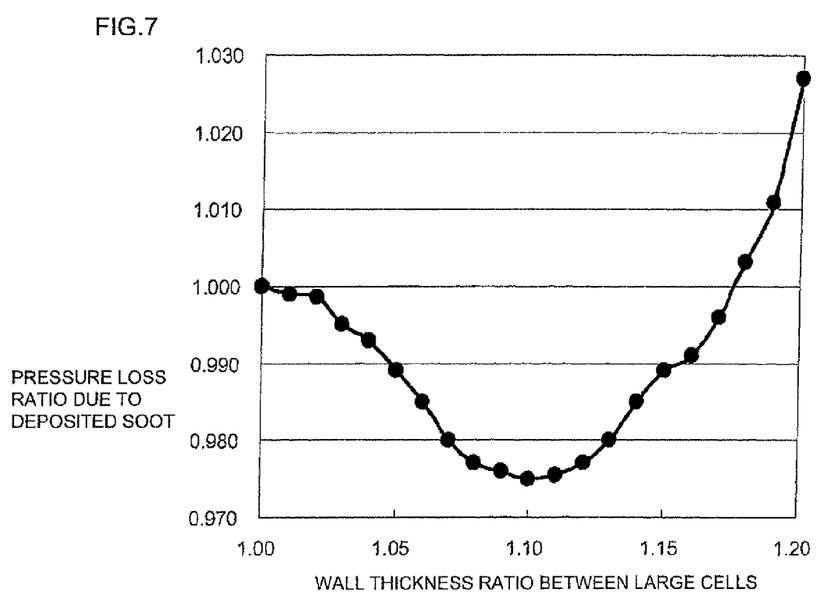
FIG. 7 is a diagram showing a pressure loss ratio due to deposited soot by the ratio of the thickness of the wall between the large cells with respect to that of the wall between the large cell and the small cell.
Figure 8:
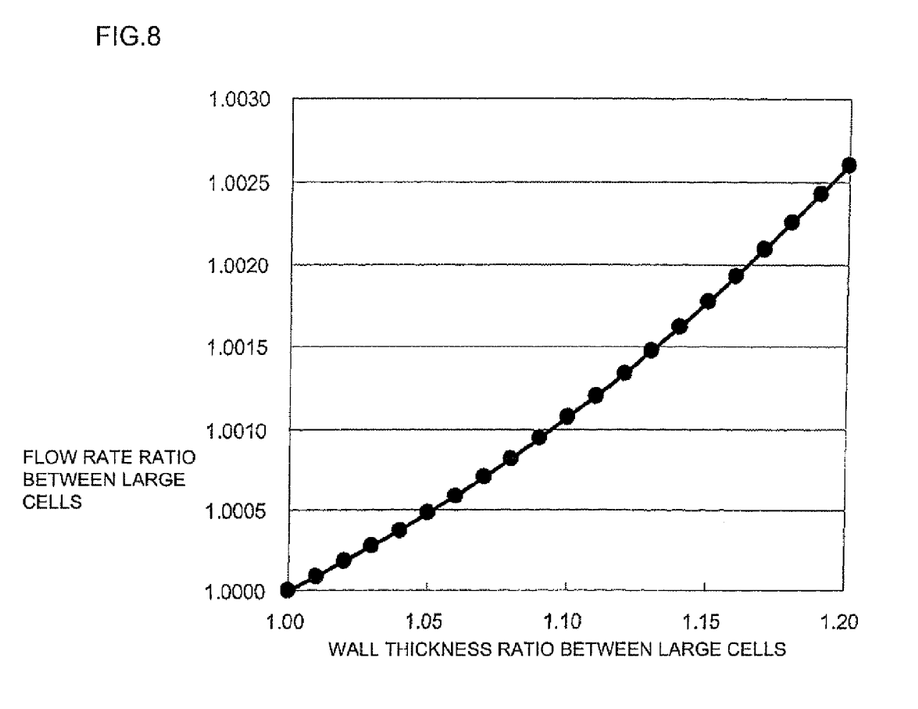
FIG. 8 is a diagram showing a flow rate ratio by the ratio of the thickness of the wall between the large cells with respect to that of the wall between the large cell and the small cell.
Figure 9:
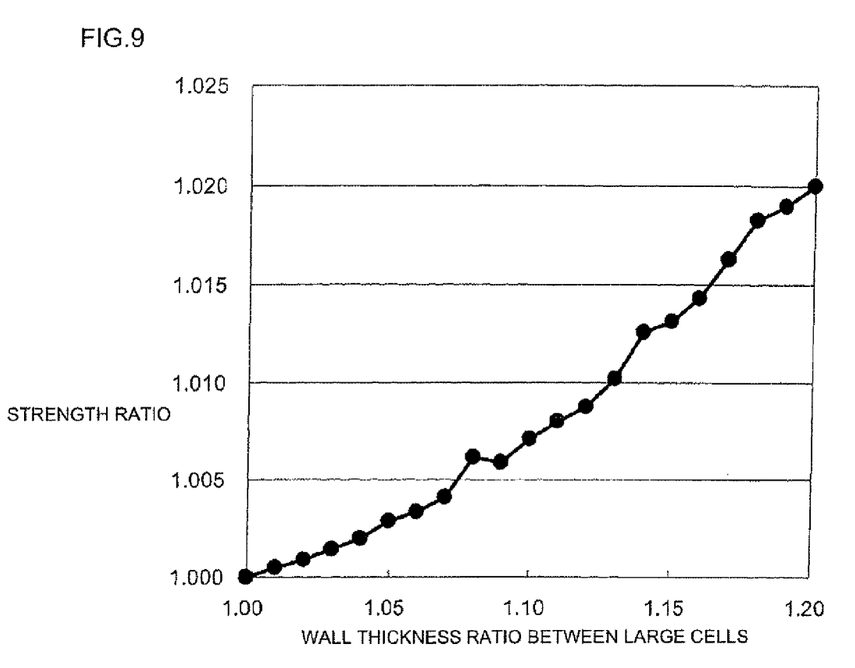
FIG. 9 is a diagram showing a strength ratio by the ratio of the thickness of the wall between the large cells with respect to that of the wall between the large cell and the small cell.

The initial pressure loss was measured in a large-sized wind tunnel on measurement conditions including an air current temperature: room temperature, a measurement flow rate: 10 Nm$^3$/min. and a soot amount: 0 g/L (FIG. 6). The pressure loss due to the deposited soot was measured by a soot generator on conditions including an air current temperature: 200° C., a measurement flow rate: 2.27 Nm$^3$/min, and a soot amount: 4 g/L (FIG. 7). A flow rate ratio by a thickness ratio of a wall between large cells was obtained by evaluating a flow speed distribution toward a wall surface in the vicinity of the wall between the large cells by use of a fluid analysis versatile code Star-LT and comparing the flow with a flow in the vicinity of a wall between the large cell and a small cell (FIG. 8). Calculating conditions included an air current temperature: 20° C., a calculation flow speed: 10 m/sec. and a soot amount: 4 g/L. A compression strength ratio by the ratio of the thickness of the wall between the large cells was measured by a method of cutting out samples each having a size of j1"×l"L (a diameter of 1 inch×a length of 1 inch) and conforming to JIS R 1608 (FIG. 9). The above results are shown together in Tables 1 and 2.

TABLE 1

| | Sample No. | | | | | | | | | |
|---|---|---|---|---|---|---|---|---|---|---|
| | 1 | 2 | 3 | 4 | 5 | 6 | 7 | 8 | 9 | 10 |
| Rib$_{large-small}$ (mil) | 12 | 12 | 12 | 12 | 12 | 12 | 12 | 12 | 12 | 12 |
| Rib$_{large-large}$ (mil) | 12 | 12.12 | 12.24 | 12.36 | 12.48 | 12.6 | 12.72 | 12.84 | 12.96 | 13.08 |
| Wall thickness ratio Rib$_{large-large}$/Rib$_{large-small}$ | 1.000 | 1.010 | 1.020 | 1.030 | 1.040 | 1.050 | 1.060 | 1.070 | 1.080 | 1.090 |
| Initial pressure loss ratio | 1.000 | 1.000 | 1.001 | 1.001 | 1.002 | 1.002 | 1.002 | 1.003 | 1.003 | 1.003 |
| Pressure loss ratio due to 4 g/L of deposited soot | 1.000 | 0.999 | 0.999 | 0.995 | 0.993 | 0.989 | 0.985 | 0.980 | 0.977 | 0.976 |
| Flow rate ratio between large cells | 1.000 | 1.000 | 1.000 | 1.000 | 1.000 | 1.000 | 1.001 | 1.001 | 1.001 | 1.001 |
| Compression strength ratio | 1.000 | 1.000 | 1.001 | 1.001 | 1.002 | 1.003 | 1.003 | 1.004 | 1.006 | 1.006 |

TABLE 2

| | Sample No. | | | | | | | | | | |
|---|---|---|---|---|---|---|---|---|---|---|---|
| | 11 | 12 | 13 | 14 | 15 | 16 | 17 | 18 | 19 | 20 | 21 |
| $Rib_{large\text{-}small}$ (mil) | 12 | 12 | 12 | 12 | 12 | 12 | 12 | 12 | 12 | 12 | 12 |
| $Rib_{large\text{-}large}$ (mil) | 13.2 | 13.32 | 13.44 | 13.56 | 13.68 | 13.8 | 13.92 | 14.04 | 14.16 | 14.28 | 14.4 |
| Wall thickness ratio $Rib_{large\text{-}large}/Rib_{large\text{-}small}$ | 1.100 | 1.110 | 1.120 | 1.130 | 1.140 | 1.150 | 1.160 | 1.170 | 1.180 | 1.190 | 1.200 |
| Initial pressure loss ratio | 1.004 | 1.005 | 1.005 | 1.007 | 1.007 | 1.007 | 1.008 | 1.009 | 1.009 | 1.009 | 1.010 |
| Pressure loss ratio due to 4 g/L of deposited soot | 0.975 | 0.976 | 0.977 | 0.980 | 0.985 | 0.989 | 0.991 | 0.996 | 1.003 | 1.011 | 1.027 |
| Flow rate ratio between large cells | 1.001 | 1.001 | 1.001 | 1.001 | 1.002 | 1.002 | 1.002 | 1.002 | 1.002 | 1.002 | 1.003 |
| Compression strength ratio | 1.007 | 1.008 | 1.009 | 1.010 | 1.013 | 1.013 | 1.014 | 1.016 | 1.018 | 1.019 | 1.020 |

FIG. 6 shows an initial pressure loss ratio by the thickness of the wall between the large cells with respect to that of the wall between the large cell and the small cell. As shown in FIG. 6, when the thickness of the wall between the large cells is increased, the initial pressure loss ratio also increases. Therefore, it apparently seems to be disadvantageous. However, as shown in FIG. 7, the pressure loss ratio due to the deposited soot decreases to a ratio of about 1.1 of the wall thickness between the large cells. That is, it is indicated that the pressure loss due to the soot deposited by the use of a ceramic filter is advantageous during the use of the ceramic filter in a case where the ratio of the wall thickness between the large cells is large as long as the ratio of the wall thickness between the large cells is about 1.18 or less. As the ratio of the wall thickness between the large cells is large, the flow rate ratio between the large cells increases as shown in FIG. 8 and the strength ratio increases as shown in FIG. 9. As described above, when the ratio of the wall thickness between the large cells is larger than 1 and is about 1.18 or less, the pressure loss due to the deposited soot is decreased while increasing the flow rate of the fluid and the strength of the ceramic filter, whereby the collecting efficiency can be improved.

INDUSTRIAL APPLICABILITY

A honeycomb filter of the present invention is useful as a collecting filter for an exhaust gas, for example, a diesel particulate filter (DPF) for collecting and removing a particulate material (particulates) included in the exhaust gas from a diesel engine or the like.

The invention claimed is:

1. A honeycomb filter including porous partition walls which define a plurality of cells as through channels of a fluid, first cells opened in one end of the filter and plugged in the other end thereof and second cells plugged in the one end and opened in the other end being alternately arranged, the fluid flowing into the one end of the filter where the first cells open being passed through the partition walls and being discharged as the passed fluid into the second cells, the passed fluid being discharged from the other end of the filter where the second cells open, wherein each cross-sectional area of the first cells is larger than that of the second cells in a cross section cut along a plane perpendicular to the longitudinal direction of the cells, the first cells and the second cells are alternately arranged in a first direction and a second direction perpendicular to the first direction in the cross section cut along the plane perpendicular to the longitudinal direction of the cells, the thickness of a 1-1 wall between the adjacent first cells is larger than that of a 1-2 wall between each first cell and the second cell adjacent to the first cell, and the thicknesses of the porous partition walls satisfy the following formula (1):

$$1 < Rib_{1\text{-}1}/Rib_{1\text{-}2} < 1.175 \qquad (1),$$

in which $Rib_{1\text{-}1}$ is the thickness of the 1-1 wall between the adjacent first cells; and $Rib_{1\text{-}2}$: the thickness of the 1-2 wall between the first cell and the second cell adjacent to the first cell.

2. The honeycomb filter according to claim 1, wherein the first cells are formed into an octagon where corners are cut off or into a square having circular arc corners, and the second cells are formed into a square.

3. The honeycomb filter according to claim 1, wherein the thicknesses of the walls between the cells and the widths of the cells satisfy the following formula (2):

$$Rib_{1\text{-}1} \geq \frac{\sqrt{2}}{2}l - \frac{1}{2}W_1 + \frac{1}{2}W_2 = Rib_{1\text{-}2}, \qquad (2)$$

in which $W_1$: the width of the first cell;

$W_2$: the width of the second cell; and l: the thickness of the wall between the adjacent second cells.

4. The honeycomb filter according to claim 2, wherein the thicknesses of the walls between the cells and the widths of the cells satisfy the following formula (2):

$$Rib_{1\text{-}1} \geq \frac{\sqrt{2}}{2}l - \frac{1}{2}W_1 + \frac{1}{2}W_2 = Rib_{1\text{-}2}, \qquad (2)$$

in which $W_1$: the width of the first cell;

$W_2$: the width of the second cell; and l: the thickness of the wall between the adjacent second cells.

5. The honeycomb filter according to claim 1, wherein a plurality of honeycomb segments including the first cells and the second cells being arranged in parallel with one another in the longitudinal direction are joined via joining material layers.

6. The honeycomb filter according to claim 2, wherein a plurality of honeycomb segments including the first cells and the second cells being arranged in parallel with one another in the longitudinal direction are joined via joining material layers.

7. The honeycomb filter according to claim 3, wherein a plurality of honeycomb segments including the first cells and the second cells being arranged in parallel with one another in the longitudinal direction are joined via joining material layers.

8. The honeycomb filter according to claim 4, wherein a plurality of honeycomb segments including the first cells and the second cells being arranged in parallel with one another in the longitudinal direction are joined via joining material layers.

* * * * *